United States Patent [19]

Bussell

[11] 4,435,929

[45] Mar. 13, 1984

[54] MODIFIED A-FRAME STRUCTURE

[76] Inventor: Hugh M. Bussell, 251 S. Willow, Cookeville, Tenn. 38501

[21] Appl. No.: 410,327

[22] Filed: Aug. 23, 1982

[51] Int. Cl.³ .......................... E04C 3/02; E04D 3/35
[52] U.S. Cl. ........................................ 52/93; 52/283; 52/690; 52/DIG. 6
[58] Field of Search ...................... 52/90–94, 52/639–643, 690–695, 262, 263, DIG. 6, 283; 411/466; 403/246, 187, 283, 405

[56] References Cited

U.S. PATENT DOCUMENTS

| 1,363,407 | 12/1920 | Goudie | 52/90 |
| 2,114,901 | 4/1938 | Henderson | 52/692 |
| 2,937,418 | 5/1960 | Sanford | 411/466 |
| 3,861,095 | 1/1975 | Foxworthy | 52/90 |
| 4,207,719 | 6/1980 | Knowles | 52/694 |
| 4,295,318 | 10/1981 | Perlman | 52/DIG. 6 |

FOREIGN PATENT DOCUMENTS 634277  3/1950  United Kingdom ................ 52/639

Primary Examiner—James L. Ridgill, Jr.
Attorney, Agent, or Firm—Abe Hatcher

[57] ABSTRACT

A web plate-bearing block structure is used to enable floor trusses to be joined to wall trusses so that wooden floor trusses may be employed in a vertical manner in constructing a modified A-frame building which does not require a vapor barrier.

10 Claims, 6 Drawing Figures

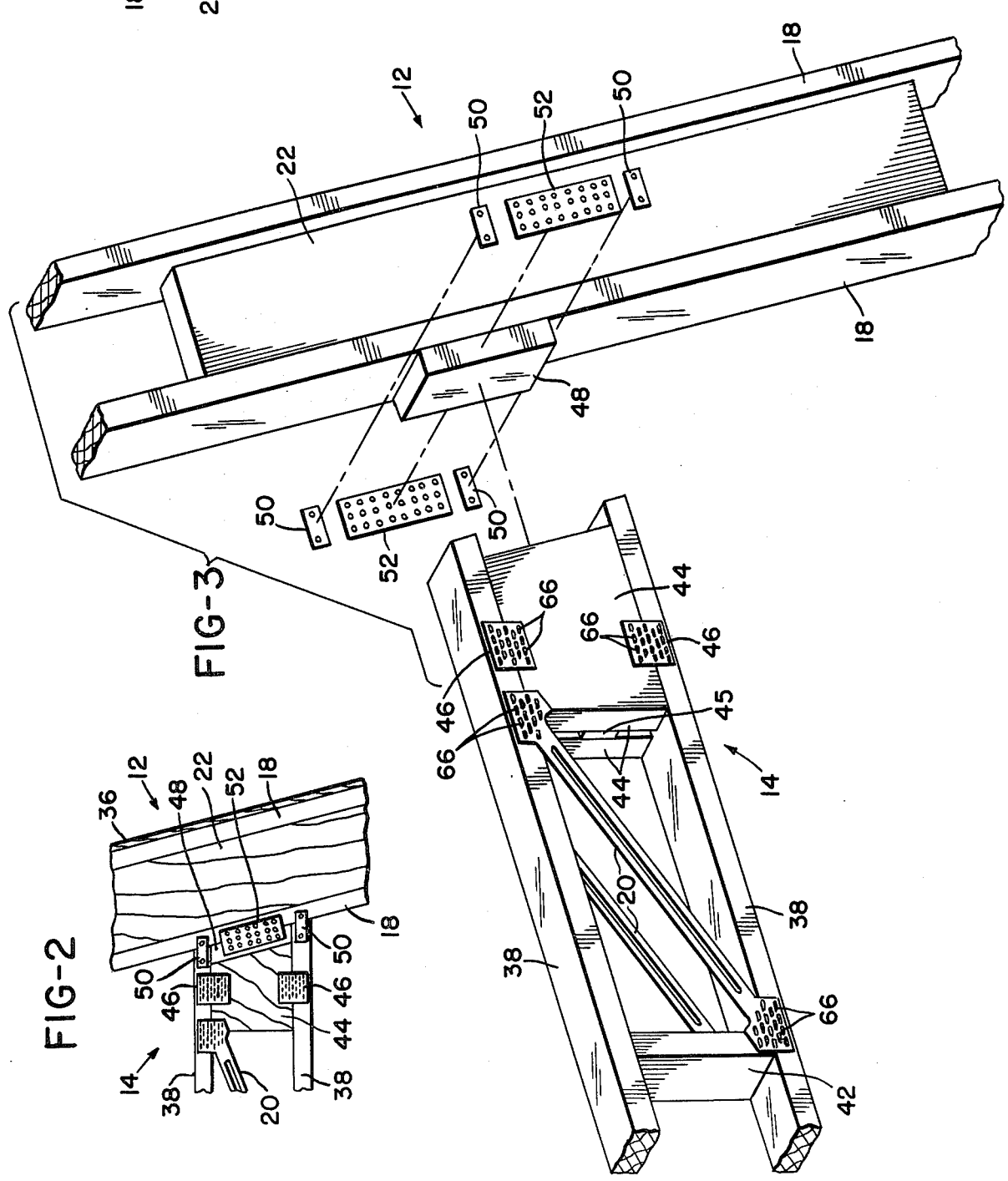

MODIFIED A-FRAME STRUCTURE

BACKGROUND OF THE INVENTION

1. Field of the Invention

This invention relates to a building structure. More particularly, it relates to a modified A-frame structure that employs wooden trusses.

2. Description of the Prior Art

Heretofore it has been impossible to make an A-frame type structure of adequate strength and durability out of wooden floor trusses.

SUMMARY OF THE INVENTION

After extended investigation I have found that a modified A-frame building of adequate structural stability may be made by using wooden floor trusses in a vertical manner in addition to their customary use as horizontal floor trusses. I modify the floor trusses by using a combination of end blocks and a spacer somewhat removed horizontally from the end blocks between the upper and lower members of the floor trusses to enable easy connection to substantially unmodified floor trusses which I use as wall trusses as the upright members of the A angled from an exact vertical or 90-degree position so that they would meet at the top if not for forming a cut-off A as I do instead of a complete A. This will be understood better from a reading of the description of the drawing which follows hereinafter. I prefer to use a spacer between two end blocks. I employ web plates, one on each side of the horizontal floor truss, extending diagonally between corners of the rectangular opening formed between the spacer and the two end blocks. The upper and lower members of the floor truss that I use horizontally fit snugly onto the upper and lower surfaces of a bearing block which fits against the inner surface of the wall truss, as may also be seen better from an examination of the drawing which forms a part hereof and will be described later herein.

I use securing plates of appropriate size for holding the end blocks in place and for securing the end blocks and the top and bottom members of the floor trusses to the wall members or vertical floor trusses. I prefer to use pronged members instead of nails or screws in conjunction with the securing plates. Additional blocks and web plates may be used as needed for proper structural strength along the length of both the horizontal floor trusses and the vertical wall trusses, actually floor trusses used as wall trusses according to the invention. Appropriate connector plates may be used at the bottom end and at the top end of each wall truss, the top end being at a roof truss which has spacers between its upper angled members meeting in the center and its lower horizontal member. Connector plates are used on the roof truss, preferably, also. At the foundation end of the upright members or wall trusses a wall support sill, anchor bolt, wall truss and block, connector plate construction may be employed. Also, an interior support beam may be used between the foundation and the horizontal floor truss.

DESCRIPTION OF THE DRAWING AND OF THE PREFERRED EMBODIMENT

For a better understanding of my invention reference will now be made to the drawing which forms a part hereof and to its description as a description of the preferred embodiment of the invention.

In the drawing,

FIG. 2 is an enlargement or enlarged view showing how the horizontal or floor truss is joined to the vertical or wall truss according to the invention, in broken away form.

FIG. 3 is an exploded view of the floor to wall truss connection according to the invention.

FIG. 4 is an enlarged corner detail of the lower floor or foundation as broken away.

FIG. 6 is a showing of the preferred slit-pronged ends for use with the web and securing plates according to the invention.

Figure 1:
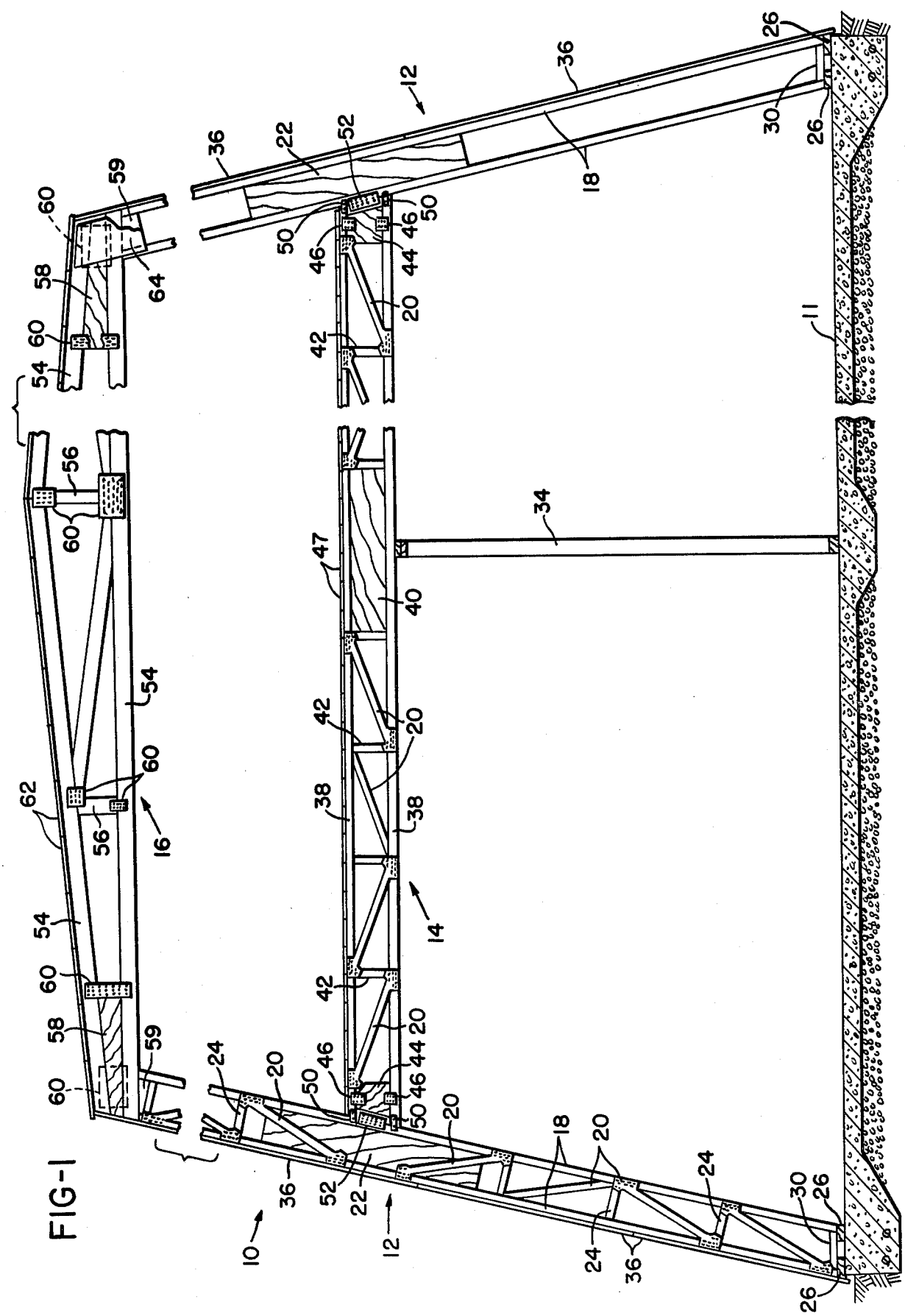
FIG. 1 is an elevational, partially sectional view of a modified A-frame structure according to the invention.
Figure 5:
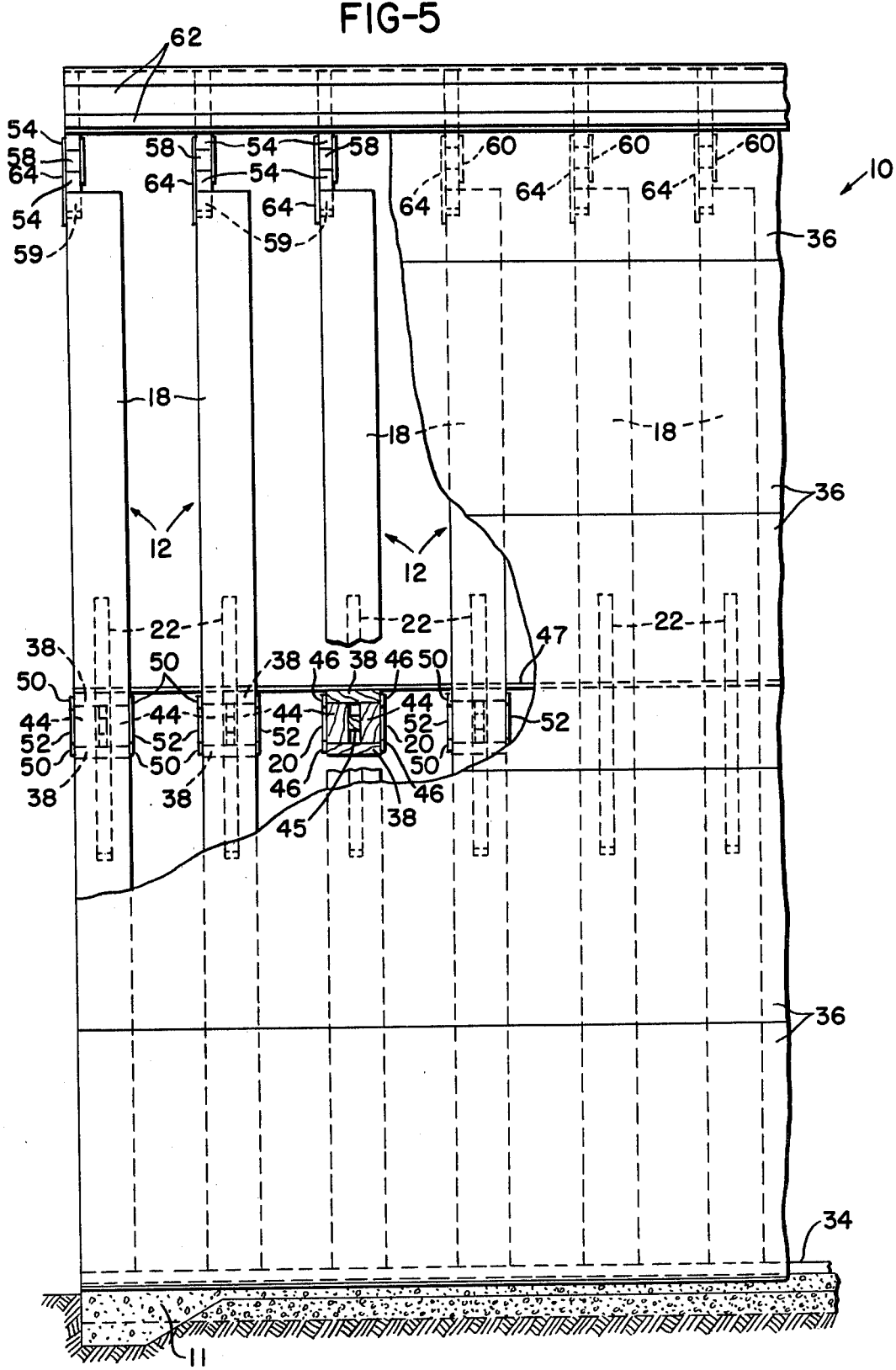
FIG. 5 is a fragmentary side elevational view of a modified A-frame structure of the invention substantially as shown in FIG. 1.

In the drawing, the modified A-frame structure according to the invention 10 is made up generally of a floor truss 14, wall truss 12 and roof truss 16. Upper and lower members 38 of floor truss 14 are substantially equivalent to wall truss chords 18. Web plates 20 are used along the length of the floor truss 14 and wall trusses 12, as are spacers 24 and 42. Support blocks 22 and 40 are used respectively with the wall trusses 12 and floor truss 14. Wall trusses 12 are secured to a foundation 11 via a sill 26/anchor bolt 28/block 30/connector plate 32 arrangement. An inner support beam 34 extending from the foundation or floor 11 to floor truss 14 may also be employed. The floor truss 14 includes upper and lower members 38, and the wall trusses chord members 18. Sheathing is indicated at 36. For attachment of the floor truss 14 to the wall truss 12 a bearing block 48 is used against which the outer end of end blocks 44 fit, end blocks 44 having a spacer 45 therebetween. Web plates 20 extend from the lower end of vertical member spacer 42 to the tops of the inner ends of end blocks 44. Securing plates 46, connector plates 50 and joining plates 52 are used in the positions shown to give a firm connection of the floor trusses 14 to the wall trusses 12. Compression-type prongs 66 are used preferably with all of the foregoing plates except the connector plates 50, which are preferably nailed on. A tongue and groove plywood sub-floor 47 may be used, if desired. Inner support blocks 40 are preferred for use with the floor trusses 14 which are horizontally positioned. Roof trusses 54 have vertical web members or spacers 56, end blocks 58, upper block wall truss connectors 59 and roof truss connector plates 60 for use in conjunction therewith. A plywood roof decking 62 may also be employed in the structure of the invention, as may plywood 64 at the roof-wall intersection.

There are many advantages of the modified A-frame structure of the invention. One is that it is space saving. Another is that it does not require a vapor barrier and can use R-30 or like conventional insulation such as fiberglas. Furthermore, construction is speedy as the basic parts are preassembled, that is, the regular horizontal floor trusses, the wall trusses which are substantially simply floor trusses used in a vertical or upright manner and the roof trusses. This means that the building can be put together in the field simply by joining each floor truss to the two wall trusses and putting on the roof truss to form each section and anchoring it to the foundation. The only connector plates that are field-connected are prepunched plates 50, the others, including the diagonal web members 20, being hydraulically pressed into the timber members of the trusses before the trusses are moved to the field for assembly of the modified A-frame structure. The only steel needed for the structure is that of these connector plates and diagonal web members except for nails usually used to fasten the blocks or blocking between the chords of the trusses in some instances. The joining of parts is simple because the connector plates and the connection ends of the diagonal web members of the trusses are punched in a manner such that the punching protrudes on one side of galvanized steel with a sharp end for the hydraulic pressing. The plywood (preferably ⅜") gusset 64 is easily field applied in connecting the roof truss to the wall truss. It is installed over a connector plate 60, for example 10 by 7, at the end of roof truss 16.

While the invention has been described in terms of preferred embodiments thereof, the claims appended hereto are intended to encompass all embodiments which fall within the spirit of the invention.

Having thus described my invention and certain preferred embodiments thereof, I claim:

1. A floor truss-wall truss assembly comprising a wooden floor truss joined to a wooden wall truss at an angle such that said floor truss is an A cross-bar member and said wall truss is an A upright member, said wall truss having a single bearing block adjacent the inside of an inner chord member thereof occupying the whole space between upper and lower chords, said floor truss having two end blocks separated by a spacer member extending between said upper and lower chords of said floor truss with said upper and lower chords protruding beyond an outer end of each of said two end blocks so as to fit respectively over and under the upper and lower ends of said single bearing block and means holding said two end blocks in position and fastening said end blocks and said upper and lower chords of said floor truss to said inner chord member of said wall truss.

2. A wooden modified A-frame structure comprising two floor trusses made of wool, each comprising an upright side of an A cut off at the upper end and having a roof truss joining the cut-off upper end of each, said two floor trusses having a third floor truss connecting same positioned at an interval below said roof truss and being made of wood and forming the cross-bar of said A, said two floor trusses acting as wall trusses for said structure.

3. The structure of claim 2 wherein each end of said third floor truss is joined to a corresponding one of said two floor trusses by means of the floor truss-wall truss assembly of claim 1.

4. The assembly of claim 1 wherein said holding and fastening means comprise hydraulically pressed punched connector plates.

5. The assembly of claim 1 wherein said holding and fastening means comprise connector plates.

6. The assembly of claim 1 wherein said holding and fastening means comprise hydraulically pressed punched connector plates and nailed connector plates.

7. The assembly of claim 1 wherein said holding and fastening means comprise connector plates and two diagonal web members each having two punched ends, one of said two diagonal web members extending from the upper part of the outside of said two end blocks and a part of one side of said upper chord diagonally to the lower part of one side of said lower chord and a part of one side of a single spacer at an interval along said cross-bar member toward the center of said cross-bar member and the other of said two diagonal web members extending from the corresponding upper part of the outer side of the other of said two end blocks and a corresponding part of said upper chord diagonally toward the corresponding lower part of the other side of said lower chord and the corresponding part of the other side of said single spacer.

8. The assembly of claim 7 wherein said connector plates comprise punched connector plates and nailed connector plates.

9. The structure of claim 3 wherein the assembly of claim 1 has holding and fastening means comprising connector plates.

10. The structure of claim 9 wherein the connector plates comprise punched connector plates and two diagonal web members, one on each side of said floor truss extending diagonally from the inner end of said two end blocks and one of said upper and lower chords to an end of a space which extends between the upper and lower chord.

* * * * *